US006521835B1

(12) United States Patent
Walsh (10) Patent No.: US 6,521,835 B1
(45) Date of Patent: Feb. 18, 2003

(54) CABLE RACEWAY FOR BRIDGES AND LIKE STRUCTURES WITH CHANNEL MEMBERS HAVING MULTIPLE DEGREES OF FREEDOM

(75) Inventor: Karl A. Walsh, Stoughton, MA (US)

(73) Assignee: K. & M. Realty Trust, Braintree, MA (US)

( * ) Notice: Subject to any disclaimer, the term of this patent is extended or adjusted under 35 U.S.C. 154(b) by 0 days.

(21) Appl. No.: 09/332,828

(22) Filed: Jun. 14, 1999

(51) Int. Cl.[7] .................................................. H02G 3/04
(52) U.S. Cl. ...................................... 174/68.3; 52/220.1
(58) Field of Search ............................... 174/68.1, 68.3, 174/95, 99 R, 48; 52/220.1, 220.3, 220.5

(56) References Cited

U.S. PATENT DOCUMENTS

| | | | |
|---|---|---|---|
| 2,470,788 A | 5/1949 | O'Brien et al. ................ 174/99 |
| 2,905,201 A | 9/1959 | McNaughton ................ 138/75 |
| 2,917,083 A | 12/1959 | Duvall et al. .................. 138/75 |
| 3,042,351 A | 7/1962 | Du Bois ........................ 248/49 |
| 3,779,003 A | 12/1973 | Boissevain et al. ........... 59/78.1 |
| 3,983,671 A | 10/1976 | Boaden et al. ................ 52/220 |
| 4,040,449 A | * 8/1977 | Butler et al. ................ 174/68.3 |
| 4,135,055 A | 1/1979 | Beckers et al. ............... 174/48 |
| 4,163,572 A | 8/1979 | Benscoter .................... 285/121 |
| 4,398,564 A | * 8/1983 | Young et al. .............. 174/68.3 |
| 4,563,542 A | * 1/1986 | Pollack ....................... 174/68.3 |
| 4,772,090 A | 9/1988 | Atkins et al. ............. 350/96.23 |
| 4,800,695 A | 1/1989 | Menchetti .................... 52/221 |
| 5,004,192 A | 4/1991 | Handler ....................... 248/49 |
| 5,024,251 A | * 6/1991 | Chapman ................... 174/68.3 |
| 5,134,250 A | 7/1992 | Caveney et al. ............. 174/101 |
| 5,162,614 A | 11/1992 | Bogiel et al. ................ 174/97 |
| 5,247,135 A | 9/1993 | Rebers et al. ................ 174/92 |
| 5,271,585 A | 12/1993 | Zetena, Jr. ................... 248/49 |
| 5,316,243 A | 5/1994 | Henneberger ............. 248/68.1 |
| 5,316,244 A | 5/1994 | Zetena, Jr. ................... 248/49 |
| 5,359,143 A | * 10/1994 | Simon ....................... 174/68.1 |
| 5,503,354 A | 4/1996 | Lohf et al. .................... 248/58 |
| 5,661,263 A | 8/1997 | Salvaggio .................... 174/48 |
| 5,784,841 A | 7/1998 | Nowell ....................... 52/220.5 |
| 6,137,057 A | 10/2000 | Gutgsell ..................... 174/101 |
| 6,143,984 A | 11/2000 | Auteri ....................... 174/68.3 |

FOREIGN PATENT DOCUMENTS

| | | | |
|---|---|---|---|
| DE | 2 353 471 | 11/1974 | |
| EP | 0 599 753 A1 | 6/1994 | |
| WO | WO 94/19852 | * 9/1994 | ................ 174/68.3 |

* cited by examiner

Primary Examiner—Dean A. Reichard
Assistant Examiner—Adolfo Nino
(74) Attorney, Agent, or Firm—Peter J. Manus; Dike Bronstein Roberts & Cushman, Intellectual Property Practice Group of Edwards & Angell, LLP (57) ABSTRACT

A cable raceway for carrying cables, e.g., fiber optic cables, across interior or exterior spaces is disclosed. The cable raceway includes a series of support channels and a plurality of main channels, each main channel being disposed in an overlaying relationship between successive pairs of support channels. An elongated slot is formed through end portions of the main channels, and bolts pass through spacers attached to the support channels and disposed in the elongated slots. The cable raceway also includes a plurality of covers set over respective channel members. Each cover includes a top portion; a pair of opposing sides extending downward perpendicularly from the top portion; and, a pair of steps formed on inner surfaces of respective sides adjacent to the top portion, thereby extending longitudinally along the length of the cover. The cable raceway includes features for making the raceway weather resistant and compliant with structural motion due to loading, seismic activity, meteorological activity, and/or thermal expansion, thereby making the cable raceway especially suitable for use on external structures such as bridges or the like.

20 Claims, 5 Drawing Sheets

CABLE RACEWAY FOR BRIDGES AND LIKE STRUCTURES WITH CHANNEL MEMBERS HAVING MULTIPLE DEGREES OF FREEDOM

BACKGROUND OF THE INVENTION

1. Field of the Invention

This invention relates generally to raceways for carrying cables, and more particularly to raceways for carrying cables across interior and/or exterior spaces. The raceway of the present invention provides at least one main channel member supported at each end by a support channel member, wherein the main channel member and the support channel member have respective covers. The raceway of the present invention also includes features that cause it to be compliant with motion due to, e.g., loading, seismic activity, meteorological activity, or thermal expansion, thereby making the raceway especially suitable for use on external structures such as bridges or the like.

2. Background

Various structures and methods have been used for carrying cables across interior and/or exterior spaces. For example, standard cable hangers have been used for stringing electrical cables. Such standard cable hangers normally cannot be used with, e.g., fiber optic cables because fiber optic cables typically lack the intrinsic strength found in most electrical cables. Accordingly, raceways or other channel structures have been used for carrying fiber optic cables or the like across interior and/or exterior spaces.

In U.S. Pat. No. 5,271,585 issued Dec. 21, 1993, to Zetena, Jr., a raceway for carrying fiber optic cables through interior spaces, e.g., offices, is described. In accordance with the disclosure, the fiber optic cable raceway includes a plurality of channel members and a plurality of telescoping members. Each channel member has a generally U-shaped cross-section with a base and sides with inwardly extending lips at the top. The telescoping members have the same generally U-shaped cross-section. However, the telescoping members are slightly larger than the channel members so that they can fit about the channel members in a longitudinally sliding fashion. By alternately interfitting the channel members and the telescoping members and adjusting the length by telescopic sliding, a cable raceway of a desired length can be quickly assembled. Further, the channel members may be enclosed with covers having downwardly extending legs that are spring-pressed outwardly to fit between the inwardly extending lips of the channel members. The channel covers can also telescope using telescoping cover members, which are slightly larger than the channel covers and have a complementary shape so that they fit about the channel covers in a longitudinally sliding fashion.

In U.S. Pat. No. 3,042,351 issued Jul. 3, 1962, to Du Bois, a cable tray assembly for carrying electric power cables in suspended positions about an industrial installation is described. According to the disclosure, the cable tray assembly includes a pair of abutting tray members, each being formed from a planar sheet of metal. Further, each tray member includes expanded areas for providing tray ventilation and reducing the overall weight of the cable tray assembly; and, non-expanded areas for providing structural support along edges, a central floor section, and corner portions of the tray member. In one embodiment of the cable tray assembly, respective strap members are coupled to the tray members for connecting the pair of tray members together at their abutting edges. Slots are also provided in a portion of the strap members for adjustable mounting of the strap members to the tray members.

Similarly, German Patent 2 353 471 published Oct. 22, 1973, discloses a structure with a plurality of elongated slots through which respective bolts extend for mounting a raceway to an intermediate bracket.

In U.S. Pat. No. 2,470,788 issued May 24, 1949, to O'Brien et al., an electrical conduit system for installation in buildings such as residential houses and industrial plants is described. In accordance with the disclosure, the electrical conduit system includes a plurality of severable conduit sections, which include a plurality of mutually abutting, rectilinearly extending channel members. Pairs of abutting channel members are held in alignment by a close-fitting sleeve, which slides over the abutting channel members. Further, the cross-section of the channel members includes a step configuration on the inner surfaces of the sides of the channel members.

Although each of the structures described above is suitable for carrying cables across interior spaces in, e.g., residential or industrial installations, it would be desirable to have a cable raceway that is suitable for carrying cables across exterior spaces, particularly, for external use on bridges or the like. Such a cable raceway would be strong, weather resistant, and easy-to-install and maintain. It would also be desirable to have a cable raceway that is not only strong but also compliant with motion due to, e.g., loading, seismic activity, meteorological activity, or thermal expansion, which normally affects bridges and like structures.

SUMMARY OF THE INVENTION

In accordance with the present invention, a cable raceway includes a series of support channels and a plurality of main channels. Each main channel is disposed between a respective pair of successive support channels. Further, the plurality of main channels is conterminous with the series of support channels, with end portions of each main channel disposed in overlaying relationships in the respective pairs of successive support channels. Each end portion of a main channel has an elongated slot formed therethrough; and, spacers attached to the respective pairs of successive support channels are disposed in the elongated slots, thereby allowing the end portions of each main channel to move with multiple degrees-of-freedom.

In another embodiment, the cable raceway is installed by attaching the first channel members to respective support members; disposing the end portions of each second channel member in the respective pairs of successive first channel members, thereby making the second channel members conterminous with the first channel members; coupling the end portions of each second channel member to the respective pairs of successive first channel members; laying cable in the conterminous first and second channel members; setting the second channel member covers over respective second channel members; and, setting the firs t channel member covers over respective first channel members.

In still another embodiment, the cable raceway further includes a plurality of support channel covers, each support channel cover being set over a respective support channel; and, a plurality of main channel covers, each main channel cover being set over a respective main channel. Each support and main channel cover includes a top portion; a pair of opposing sides extending downward perpendicularly from the top portion; and, a pair of steps, each step being formed on an inner surface of a respective side adjacent to the top portion and extending longitudinally along at least a portion of the length of the channel cover. The steps of each channel cover rest on respective edges of sides extending upward perpendicularly from a base of a respective channel.

The cable raceway of the present invention is particularly useful for carrying cables, e.g., fiber optic cables, across existing, external structures such as bridges or the like.

Still further aspects and advantages will become apparent from a consideration of the ensuing description and drawings.

BRIEF DESCRIPTION OF THE DRAWINGS

The invention will be better understood by reference to the following more detailed description and accompanying drawings in which.

DESCRIPTION OF THE PREFERRED EMBODIMENT

Figure 1:
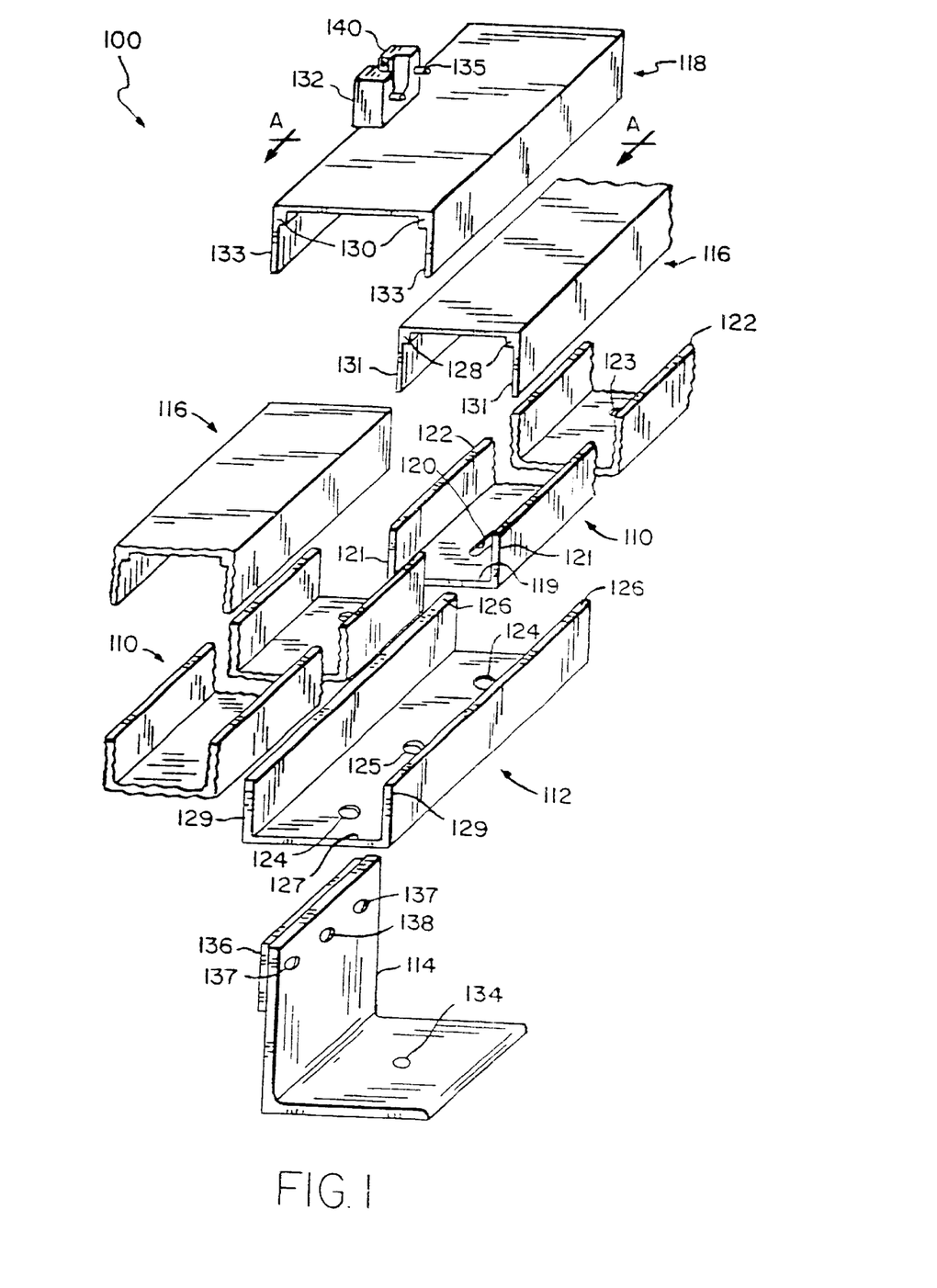
FIG. 1 is an exploded, perspective view of a cable raceway in accordance with the present invention.

FIG. 1 shows an exploded, perspective view of a cable raceway section 100 in accordance with the present invention. The raceway section 100 includes main channel members 110, each having a base 119 and sides 121 extending upward perpendicularly from the base 119, thereby forming a generally U-shaped, rectangular cross-section. The raceway section 100 also includes a support channel member 112, which has a base 127 and sides 129 extending upward perpendicularly from the base 127, thereby forming a generally U-shaped, rectangular cross-section that is slightly larger than the cross-section of the main channel members 110. As a result, there is sufficient clearance for end portions (not numbered) of the main channel members 110 to be disposed in the support channel member 112 in an overlaying relationship (see also FIG. 2).

Each main channel member 110 includes elongated slots 120 formed in the base 119 adjacent to opposing ends of the main channel member 110. When the end portions of the main channel members 110 are disposed in the support channel member 112, the slots 120 are in registration with holes 124, which are formed in the base 127 of the support channel member 112. The slots 120 and the holes 124 are used for coupling the main channel members 110 to the support channel member 112 in a longitudinally sliding and slightly rotatable fashion Stainless steel plug inserts 311 (see FIGS. 2 and 3C) are preferably provided in the holes 124 for receiving suitable bolts 310 passing through respective slots 120 (see FIGS. 3A and 3B). Further, the bolts 310 are seated in the plug inserts 311 for allowing the slight longitudinal and rotational motion of the main channel members 110 relative to the support channel member 112. The coupling between the main channel members 110 and the support channel member 112 will be described in further detail below with reference to FIG. 3C.

Each main channel member 110 also includes a plurality of weep holes 123 formed in the base 119 at intermittently spaced locations along the centerline of the main channel member 110. Similarly, the support channel member 112 includes a weep hole 125 formed in the base 127 at a mid-point location along the centerline of the support channel member 112.

The weep holes 123 in the base 119 of the main channel member 110 are neither aligned with nor obstructed by the base 127 of the support channel member 112. Accordingly, any moisture that may accumulate inside the main channel member 110 can freely drain through the weep holes 123.

The support channel member 112 rests on an angle bracket 114 such that the weep hole 125 is in registration with a matching weep hole 134 formed in a horizontal portion (not numbered) of the angle bracket 114, thereby allowing any moisture that may accumulate inside the support channel member 112 to drain through the weep holes 125 and 134.

The support channel member 112 may be attached to the angle bracket 114 in any conventional manner. In the preferred embodiment, the support channel member 112 is welded to the horizontal portion of the angle bracket 114. Further, the angle bracket 114 optionally includes a plate 136 welded to a vertical portion (not numbered) of the angle bracket 114 for facilitating attachment of the angle bracket 114 to a vertical support member 210 (see also FIG. 2). A plurality of holes 137 (FIG. 1) is provided through the vertical portion of the angle bracket 114 and the plate 136 for receiving bolts 139 (see FIG. 2) for attaching the angle bracket 114 to the vertical support member 210.

The raceway section 100 further includes main channel covers 116 and a support channel cover 118. Each main channel cover 116 has downwardly extending sides 131, thereby forming a generally inverted U-shaped, rectangular cross-section. Inner surfaces of the sides 131 are configured with steps 128 adjacent to a top, horizontal section (not numbered) of the main channel cover 116. The steps 128 extend longitudinally along the full length of the main channel cover 116.

Further, the main channel cover 116 is the same length as the main channel member 110, but has cross-sectional dimensions that are slightly larger than those of the main channel member 110. As a result, there is sufficient clearance for allowing the main channel member 110 to be disposed between the sides 131 of the main channel cover 116, thereby allowing the main channel cover 116 to enclose the main channel member 110. Specifically, when the main channel cover 116 encloses the main channel member 110, the steps 128 rest on edges 122 of the sides 121, thereby increasing the cross-sectional area of the enclosed main channel member 110.

Similarly, the support channel cover 118 has downwardly extending sides 133, thereby forming a generally inverted U-shaped, rectangular cross-section. Inner surfaces of the sides 133 are configured with steps 130 adjacent to a top, horizontal section (not numbered) of the support channel cover 118. The steps 130 extend longitudinally along the full length of the support channel cover 118.

Further, the support channel cover 118 is the same length as the support channel member 112, but has cross-sectional dimensions that are slightly larger than those of the support channel member 112. As a result, there is sufficient clearance for allowing the support channel member 112 to be disposed between the sides 133 of the support channel cover 118, thereby allowing the support channel cover 118 to enclose the support channel member 112.

Specifically, when the support channel cover 118 encloses the support channel member 112, the steps 130 rest on edges 126 of the sides 129, thereby increasing the cross-sectional area of the enclosed support channel member 112. Further, the support channel member 112 is welded to the angle bracket 114 to provide a gap 220 (see FIG. 2) between the support channel cover 118 and the vertical portion (not numbered) of the angle bracket 114 so that the support channel cover 118 can be set over the support channel member 112 without obstruction.

More specifically, the increased cross-sectional area of the enclosed support channel member 112 allows sufficient clearance between the top, horizontal section of the support channel cover 118 and the enclosed main channel members 110 disposed in overlaying relationships in the support channel member 112.

Not only do the steps 128 and 130 increase the cross-sectional areas of the enclosed main channel members 110 and the enclosed support channel member 112, respectively, but they also strengthen the portions of the main channel covers 116 and the support channel cover 118 that rest on the edges 122 and 126, respectively. This is important because it is expected that during use the channel covers 116 and 118 will occasionally shift slightly relative to the channel members 110 and 112, thereby causing some functional wear between the steps 128 and 130 and the edges 122 and 126.

Further, the support channel cover 118 includes a brace 132 centrally attached on an edge (not numbered) of the top, horizontal section of the support channel cover 118, for attaching the support channel cover 118 to the angle bracket 114 and for tightly holding a security cover 410, which will be described in detail below with reference to FIGS. 4A and 4B. An illustrative embodiment of the brace 132 includes a stepped slot 140 for receiving a wide-flange bolt 312 (see FIG. 3B), which is secured in a tapped hole 138 in the angle bracket 114. The brace 132 further includes a plurality of rods 135 protruding horizontally from the brace 132 and used for tightly holding the security cover 410 in place.

The brace 132 may be welded to the top of the support channel cover 118. Specifically, the brace 132 is welded to the support channel cover 118 so that it protrudes slightly beyond the edge of the top, horizontal section of the support channel cover 118 adjacent to the vertical portion of the angle bracket 114. Accordingly, when the bolt 312 attaches the support channel cover 118 to the angle bracket 114, the gap 220 is preserved between the support channel cover 118 and the angle bracket 114.

Figure 2:
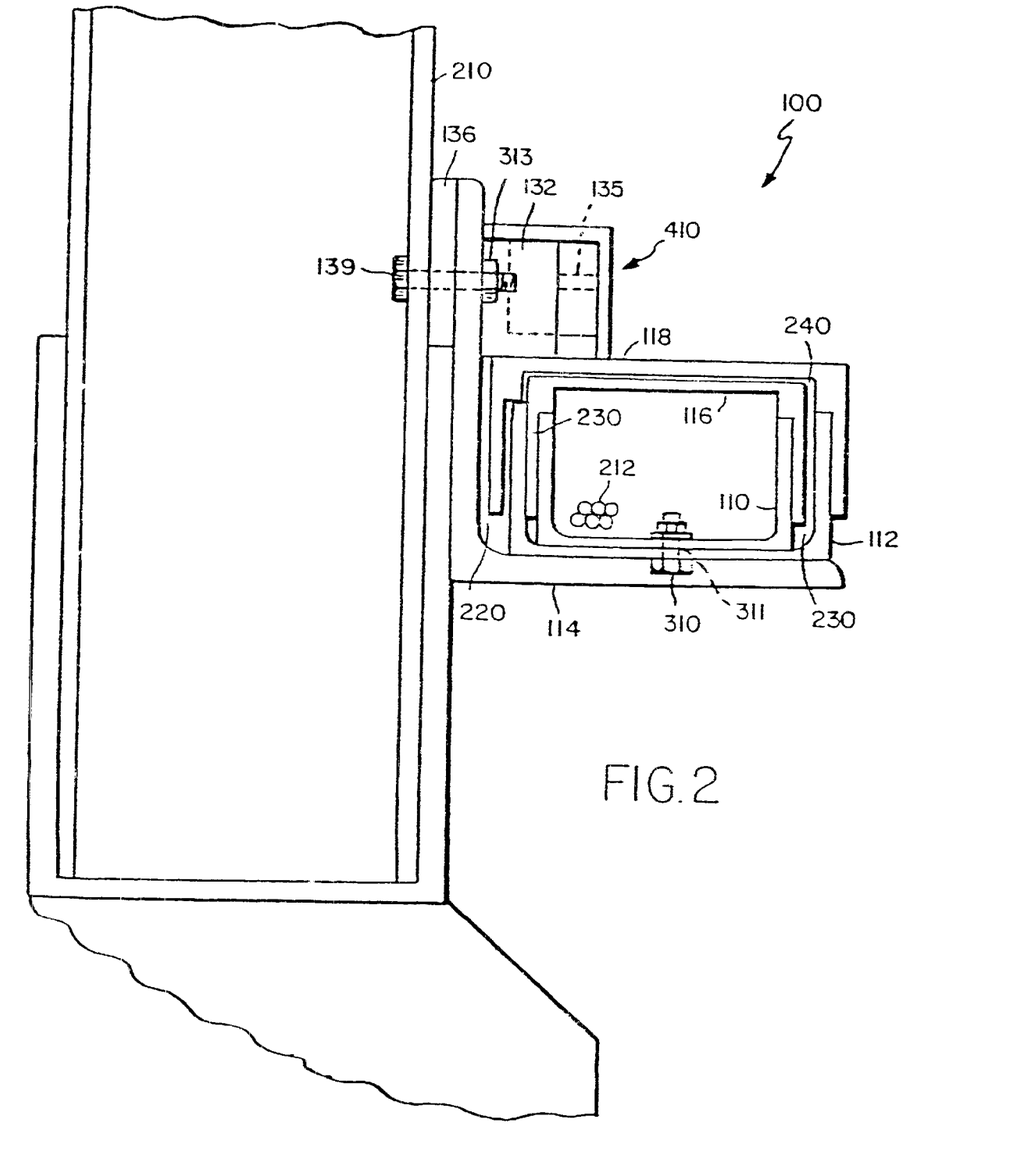
FIG. 2 is a cross-sectional view of the cable raceway taken along the line A—A of FIG. 1, with the cable raceway being coupled to a vertical support.

The cooperation between the main channel members 110, the support channel member 112, the angle bracket 114, the main channel covers 116, the support channel cover 118, and the security cover 410 is more clearly shown in FIG. 2, which is a crosssectional view of the raceway section 100 taken along the line A—A. FIG. 2 also shows the gap 220 between the support channel cover 118 and the angle bracket 114, gaps 230 between the main channel cover 116 and the support channel member 112, and a gap 240 between the main channel cover 116 and the support channel cover 118.

Further, FIG. 2 shows a plurality of cables 212, which may be electrical or communications cables, e.g., fiber optic cables, lying in the main channel member 110; and, the angle bracket 114 attached to the vertical support member 210, which may be, e.g., a railing post on a bridge structure. Specifically, a pair of bolts 139 (only one bolt 139 is shown) pass through holes (not shown) in the vertical support member 210 and the holes 137 formed in the plate 136 and the angle bracket 114, and are secured by respective nuts 313. In the preferred embodiment, the bolts 139 pass through the holes in the support member 210 and the holes 137 from the railing side, thereby allowing the security cover 410 to enclose the nuts 313. Respective angle brackets 114 may be attached to a series of such railing posts on the bridge structure, thereby forming supports for a cable raceway spanning the full length of the bridge structure.

Figure 3A:
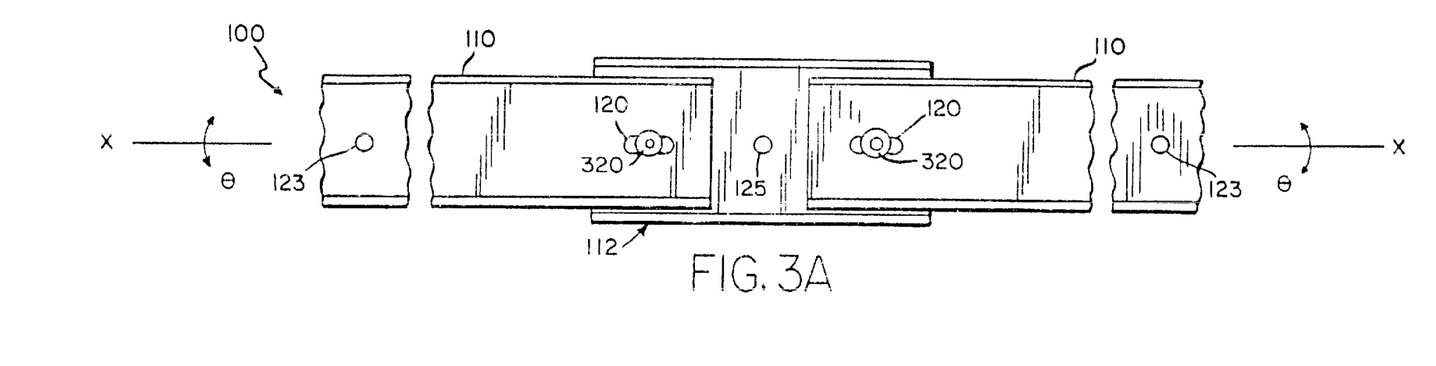
FIG. 3A is a top plan view of main channels and a support channel of the cable raceway according to the present invention.

FIG. 3A shows a top plan view of the main channel members 110 disposed in the support channel member 112 with the main channel covers 116 and the support channel cover 118 removed. As described above, the slots 120 are in registration with the holes 124 formed in the base 127 of the support channel member 112, thereby allowing, e.g., the bolts 310 to pass through the slots 120 and the holes 124 for coupling the main channel members 110 to the support channel member 112.

In the preferred embodiment, the main channel members 110 are coupled to the support channel member 112 in such a manner as to allow movement of the main channel members 110 relative to the support channel member 112. For example, the elongated slots 120 allow limited, longitudinal movement of the main channel members 110 along an x-axis (see FIG. 3A); and, the gaps 230 allow limited, rotational movement of the main channel members 110 through an angle $\theta$ (see FIG. 3A).

Figure 3B:
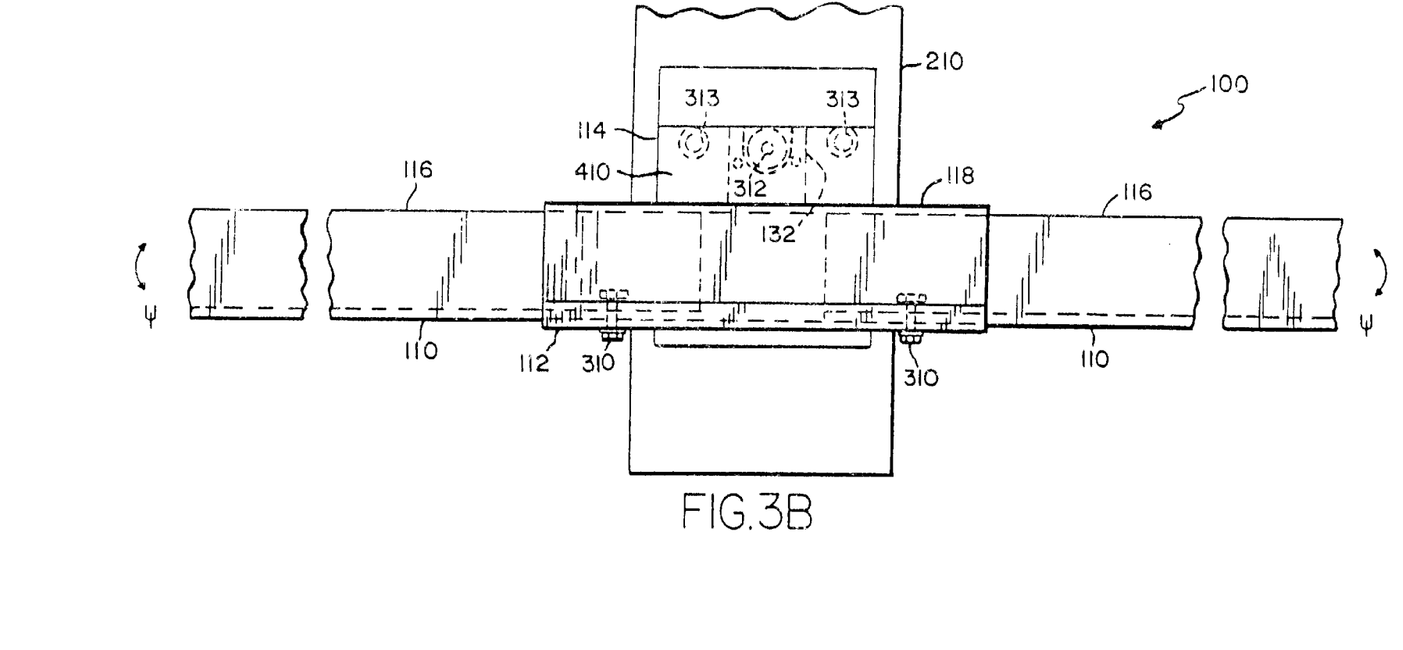
FIG. 3B is a side view of the cable raceway coupled to the vertical support of FIG. 2.
Figure 3C:
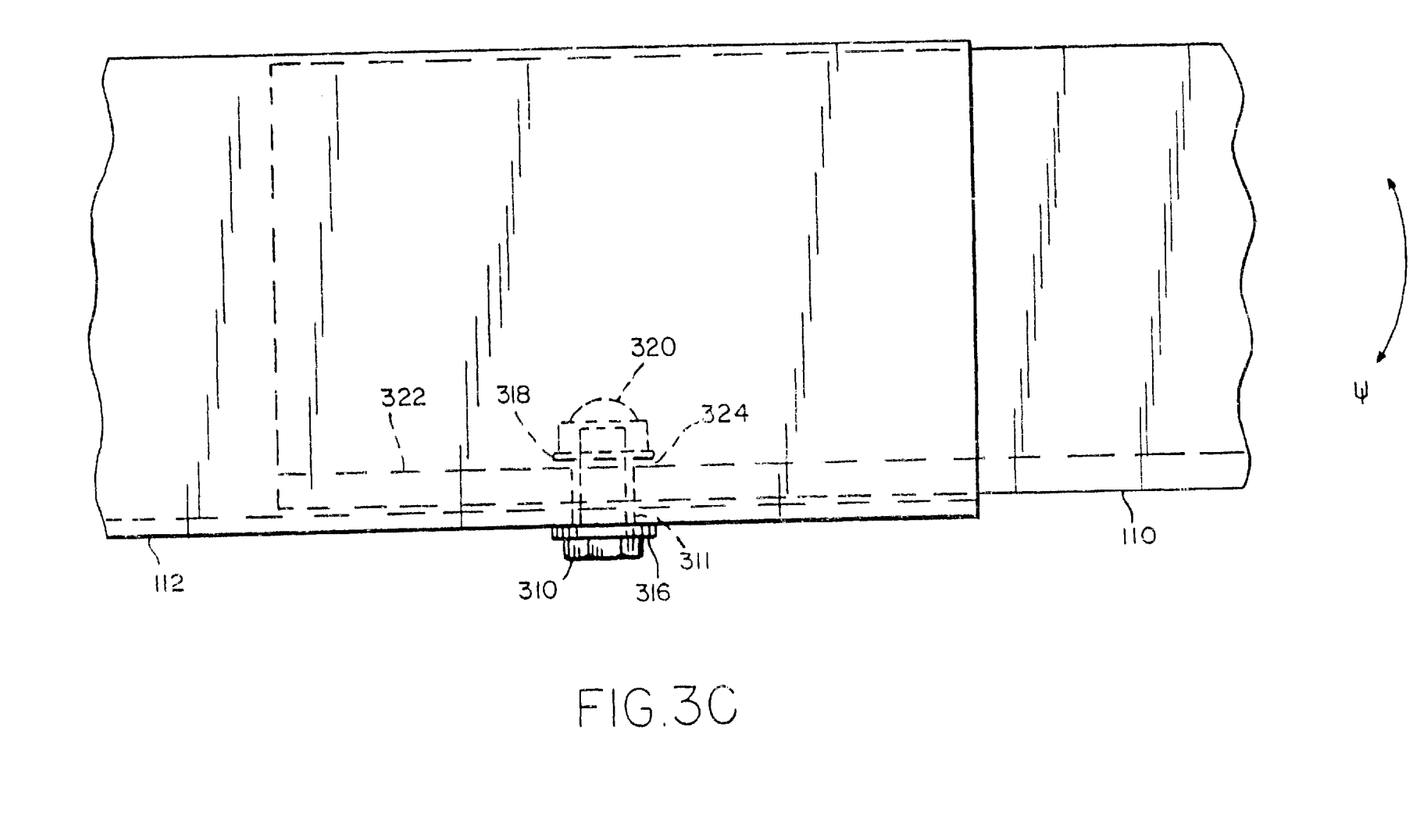
FIG. 3C is a detailed side view of a coupling between one of the main channels and the support channel.

FIG. 3C shows the coupling between the main channel member 110 and the support channel member 112 in greater detail. As mentioned above, a respective stainless steel plug insert 311 is provided in each hole 124 formed in the bottom of the support channel member 112 for receiving the bolts 310, which optionally pass through respective lock washers 316. Specifically, the plug insert 311 is secured in the hole 124 in a conventional manner and passes through the slot 120 so that it protrudes beyond the bottom surface of the main channel member 110. As a result, when a nut 320 is attached to the end of the bolt 310, the plug insert 311 acts as a spacer and provides a gap 324 between the nut 320 and the bottom surface of the main channel member 110. Further, the nut 320 preferably has a wide-domed head to prevent exposed ends of the bolts 310 from abrading the cables 212.

FIG. 3B shows a side view of the raceway section 100 with the main channel covers 116 and the support channel cover 118 in place and the angled bracket 144 attached to the vertical support member 210. Accordingly, the gap 240 (see FIG. 2) and the gap 324 allow limited, rotational movement of the main channel members 110 relative to the support channel member 112 through an angle $\psi$ (see FIG. 3B). Each main channel member 110 can therefore move with at least 3-degrees-of-freedom, e.g., linearly along the x-axis and rotationally through the angles $\theta$ and $\psi$, relative to the support channel member 112.

It is known to those skilled in this art that although bridges or the like are rigid structures, they are subject to motion caused by various factors such as static and/or dynamic loading, seismic activity, meteorological activity, thermal expansion, etc. Because the main channel members 110 are seated in the support channel member 112 for allowing limited movement of the main channel members 110 relative to the support channel member 112, and because the assembled raceway section 100 incorporates the gaps 230, 240, and 324 and the elongated slots 120 for allowing the main channel members 110 to move with 3-degrees-of-freedom relative to the support channel member 112, the raceway section 100 is compliant with such structural motion. Further, because the gaps 230 and 240 minimize frictional contact between the main channel cover 116 and both the support channel member 112 and the support channel cover 118 during such structural motion, excessive frictional wearing of the raceway section 100 is substantially reduced.

FIG. 3B also shows that when the support channel cover 118 is set over the support channel member 112 with the enclosed main channel members 110 disposed therein, access to the cables 212 (FIG. 2) lying in the main channel members 110 and the support channel member 118 is restricted. Similarly, when the security cover 410 is tightly held in place by the brace 132, access to the bolt 312 and the nuts 313 is restricted.

Figure 4A:
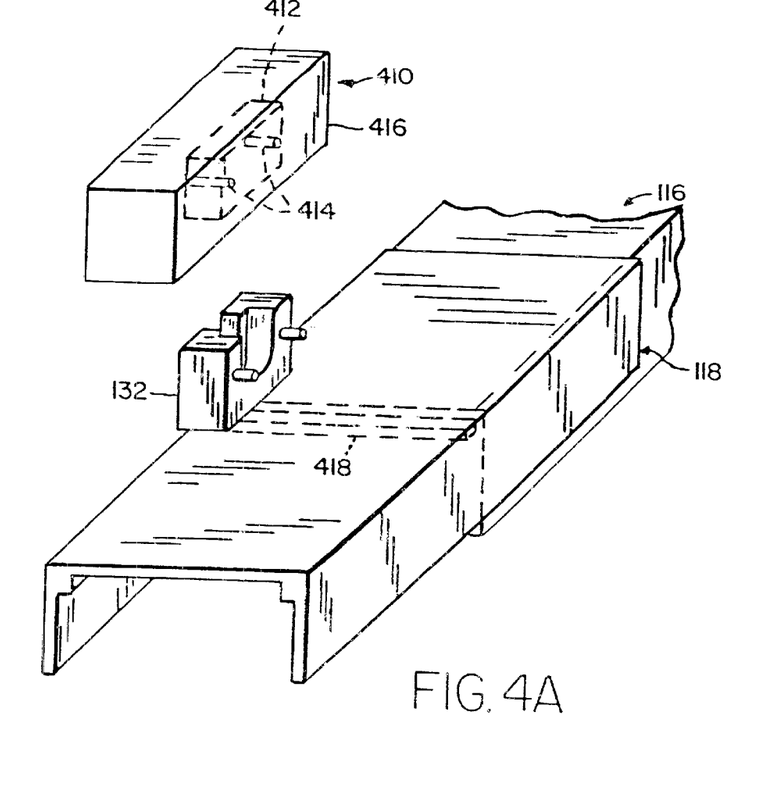
FIG. 4A is an exploded, perspective view of a cover for the support channel and a security cover in accordance with the present invention.
Figure 4B:
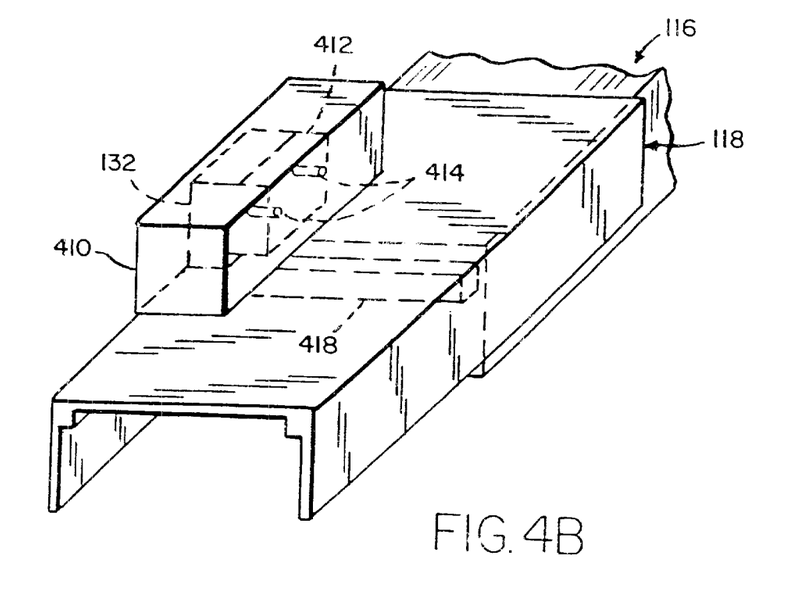
FIG. 4B is a perspective view of the security cover coupled to the support channel cover.

FIG. 4A shows an exploded, perspective view of the support channel cover 118 and a security cover 410; and, FIG. 4B shows a perspective view of the security cover 410 being held by the brace 132 of the support channel cover 118. The security cover 410 includes a plate 412 with holes 414 formed therein for snugly receiving the rods 135 horizontally protruding from the brace 132. The plate 412 may be welded to an inner surface of a side 416 of the security cover 410. Because the bottom and the side opposite the side 416 are open, the security cover 410 can be quickly attached to the brace 132 of the support channel cover 118 using a rubber-headed mallet or the like.

As mentioned above, a plurality of holes 137 is provided through the vertical portion of the angle bracket 114 for receiving the bolts 139 that attach the angle bracket 114 to the vertical support member 210. Similarly, a tapped hole 138 is provided in the vertical portion of the angle bracket 114 for receiving the bolt 312 that attaches the support channel cover 118 to the angle bracket 114. Accordingly, when the security cover 410 is attached to the brace 132 of the support channel cover 118, the security cover 410 is aligned with the holes 137 and 138, thereby restricting access to the bolt 312 and the nuts 313 secured to the bolts 139 (see FIG. 3B). The security cover 410 can therefore be used for preventing tampering with the bolts 139 attaching the angle bracket 114 to the vertical support member 210, and the bolt 312 attaching the support channel cover 118 to the angle bracket 114. Further, because the support channel cover 118 must be removed first in order to gain access to the cables 212 lying in the main channel members 110 and the support channel member 112, the security cover 410 completely restricts unauthorized access to the cables 212.

FIGS. 4A and 4B also show in shadow a stop bar 418 attached transversely to the inner top surface of the support channel cover 118 between the steps 130. As mentioned above, it is expected that during use the main channel cover 116 will occasionally shift slightly relative to the main channel member 110. When opposing ends of the main channel member 110 and cover 116 are disposed in successive enclosed support channel members 112, the stop bars 418 will therefore prevent the main channel cover 116 from excessively shifting relative to the main channel member 110. Accordingly, the cross-section of the stop bar 418 extends downwardly from the support channel cover 118 a distance sufficient to impinge upon the end of the shifting main channel cover 116.

The cable raceway of the present invention is especially suitable for use on external structures such as bridges or the like. Accordingly, the cable raceway 100 may be quickly installed on such external structures as follows. First, a plurality of angle brackets 114 with support channel members 112 welded thereto are attached to respective, intermittently spaced, vertical support members 210, e.g. railing posts on a bridge. For example, the angle brackets 114 may be secured to outside surfaces of the railing posts at each post's base cleat (not numbered; see FIG. 2). In the preferred embodiment, each angle bracket 114 is provided with the holes 137 that extend through the plate 136 and match corresponding holes (not shown) in the vertical support member 210 for receiving the stainless steel bolts 139.

For the illustrative embodiment shown in FIG. 2, the plate 136 rests on the base cleat of the vertical support member 210. As a result, only a limited amount of shear stress is applied to the bolts 139. Instead, the bolts 139 are primarily subjected to tension forces, thereby preventing rotational movement of the raceway 100 away from the vertical support member 210. This minimizes the chance that one or more of the bolts 139 will fail in use.

Next, the main channel members 110 are disposed in the support channel members 112 such that plug inserts 311 at the ends of successive support channel members 112 pass through slots 120 at each end of the main channel members 110. Accordingly, each main channel member 110 has a length sufficient for spanning the distance between the successive support channel members 112 and disposing the end portions of the main channel member in the successive support channel members 112. The bolts 310, the plug inserts 311, and the nuts 320 are then used for movably securing the main channel members 110 to the support channel members 112. Once all of the support channel members 112 and the main channel members 110 are in place, the cables 212 are laid in the channels 110 and 112.

The main channel covers 116 are then placed over the main channel members 110; and, the support channel covers 118 are placed over the support channel members 112, thereby completely enclosing the cables 212. Next, wide-flange bolts 312 with optional spacing washers (not shown) are passed through stepped slots 140 and secured in tapped holes 138 in respective angle brackets 114, thereby attaching the support channel covers 118 to the angle brackets 114. The security covers 410 are then attached to the braces 132 of the support channel covers 118, thereby preventing any tampering with the bolts 312 and the nuts 313 secured to the bolts 139, and also preventing any unauthorized access to the cables 212.

In the illustrative embodiment of the raceway section 100, the main channel members 110, the support channel members 112, the angle brackets 114, the main channel covers 116, the support channel covers 118, and the security covers 410 are fabricated using grade 6061–T6 anodized aluminum. This makes the cable raceway lightweight, thereby facilitating assembly of the cable raceway and allowing installation of the cable raceway on, e.g., railing posts, which typically are not designed for supporting very heavy loads. This also gives the overall cable raceway assembly sufficient strength for use on external structures such as bridges or the like. However, it should be noted that the choice of material used for fabricating the raceway section 100 would be dependent upon the composition of the structure to which the raceway 100 will be attached. For example, the material for the raceway section 100 should be chosen so that when the raceway 100 contacts the supporting structure, no catalysis occurs over time.

Useful dimensions for the main channel members 110 are a 4.00-inch wide base and 2.00-inch high sides. The length of the main channel members 110 is typically dependent upon the spacing of the vertical support members 210 on existing structures. In the illustrative embodiment, a maximum useful length of the main channel members 110 is 11-feet. Further, useful dimensions for the support channel members 112 are a 5.00-inch wide base and 2.25-inch high sides; and, a useful length for the support channel members 112 is 10.00-inches.

The overall widths of the main channel covers 116 and the support channel covers 118 are slightly larger than the widths of the main channel members 110 and the support channel members 112, respectively, so that they can be quickly set over the channels members 110 and 112. However, the lengths of the main channel covers 116 and the support channel covers 118 preferably match the lengths of the channel members 110 and 112, respectively.

More specifically, useful dimensions for the steps 128 formed in the main channel covers 116 are 0.30-inch wide and 0.38-inch high; and, useful dimensions for the steps 130 formed in the support channel covers 118 are 0.29-inch wide and 0.43-inch high. Further, useful dimensions for the slots 120 are 0.57-inch wide and 1.50-inch long; and, a useful dimension for the weep holes 123 and 125 is 0.50-inch diameter.

The security cover 410 is preferably long enough for blocking access to the bolts 139 in the holes 137 and the bolts 312 in the holes 138 when it is tightly held by the brace 132. Finally, the angle bracket 114 is preferably wide enough for safely supporting the main channel member 110, the support channel member 112, the main channel cover 116, and the support channel cover 118. Further, the width of the angle bracket 114 is typically dependent upon the width of the vertical support member 210. In the illustrative embodiment, useful dimensions for the angle bracket 114 are a 6.00-inch wide and 5.00-inch long horizontal portion, and a 5.00-inch long and 6.00-inch high vertical portion.

It follows from the above description that important advantages are derived from the cable raceway of the present invention. For example the cable raceway is lightweight and easy-to-install on an existing structure. In particular, because the lightweight cable raceway can be installed on, e.g., railing posts on a bridge, the cable raceway allows easy access to the cables 212 lying therein.

In addition, the cable raceway is easy-to-manufacture. For example, all components of the cable raceway 100 can be manufactured from standard aluminum sections with the exception of the main channel covers 116 and the support channel covers 118. Specifically, main channel members 110, the support channel members 112, and the angle brackets 114 can be fabricated using standard extrusion processes; and, the main channel covers 116 and the support channel covers 118 can be fabricated using custom extrusion processes for forming the step features 128 and 130. This means that the the main channel members 110, the support channel members 112, and the angle brackets 114 can be quickly provided, assembled, and attached to the supporting structures 210 while the longer lead items, i.e., the main channel covers 116 and the support channel covers 118, are being manufactured.

In addition, the main channel covers 116, the support channel covers 118, and the weep holes 123 and 125 in the main channel members 110 and the support channel members 112, respectively, make the cable raceway weather resistant. As a result, the cables 212 lying within the cable raceway are protected from the effects of wind, rain, snow, and ice, which may degrade the performance of the cables 212 throughout the year. Further, the slots 120 formed in the main channel members 110 make the cable raceway compliant with thermal expansion of both the existing structure and the cable raceway itself.

Not only is the cable raceway compliant with thermal expansion, but the gaps 230, 240, and 324, and the slots 120 also make the cable raceway compliant with motion of the existing structure, e.g., a bridge, caused by static and/or dynamic loading, seismic activity, meteorological activity, etc. Further, the gaps 230, 240, and 324, and the slots 120 make the cable raceway compliant with variations in the straightness of the existing bridge structure.

In addition, all of the elements of the cable raceway, including the main channel members 110, the support channel members 112, the angle brackets 114, the main channel covers 116, the support channel covers 118, and the security covers 410, can be quickly removed and replaced, if necessary, even after the cables 212 are installed within the cable raceway. This makes the cable raceway of the present invention very easy-to-maintain. Significantly, the cable raceway sections can be completely removed, replaced, and/or repaired without interrupting electrical or communications services or other utility provided by the cables 212 disposed therein.

Having described the preferred embodiment, numerous alternative embodiments or variations might be made. For example, it was described that the steps 128 and 130 extend longitudinally along the full lengths of the main channel cover 116 and the support channel cover 118, respectively. However, this is merely an illustration. The steps 128 and 130 might alternatively extend longitudinally along only a portion of the lengths of the covers 116 and 118 so long as the steps 128 and 130 can stably rest on the edges 122 and 126, respectively, of the channel members 110 and 112.

It was also described that the main channel covers 116 and the support channel covers 118 match the lengths of the main channel members 110 and the support channel members 112, respectively. However, this is also merely an illustration. The covers 116 and 118 might alternatively be provided in different lengths so long as access to the cables 212 is completely restricted by the covers 116 and 118. Further, no matter what the lengths of the main channel covers 116 and the support channel covers 118, the support channel covers 118 are preferably set over the support channel members 112 so that the covers 118 at least partially overlap the covers 116, thereby ensuring that the cable raceway is weather resistant.

It was also described that the brace 132 includes the stepped slot 140 and the plurality of rods 135 extending therefrom for tightly holding the security cover 410. However, this is merely an illustration. Alternative structures for the brace 132 are possible so long as the brace 132 tightly holds the security cover 410, thereby restricting access to the bolts 312 attaching the support channel covers 118 to the angle brackets 114, and the nuts 313 secured to the bolts 139 attaching the angle brackets 114 to the vertical support members 210.

It was also described that the cable raceway of the present invention is fabricated using grade 6061–T6 anodized aluminum. However, this is also merely an illustration. The cable raceway may be fabricated using alternative materials. It should be noted, however, that preferred embodiments of the cable raceway are fabricated from materials that are both strong and lightweight, and that resist catalysis when contacting the vertical support members. Useful dimensions for the cable raceway were also described. However, it should be understood that these dimensions are merely illustrative and other dimensions may be used.

It was also described that the cable raceway of the present invention is especially suitable for use on external structures such as bridges or the like. However, this is merely an illustration. The cable raceway may alternatively be used for carrying cables across interior spaces. In this case, interior walls, structural supports, or hangers may serve as the vertical support members 210 for supporting the raceway sections 100. Alternative embodiments of the angle brackets 114 may also be provided for installing the cable raceway below a floor or above a dropped ceiling. It follows that alternative embodiments of the angle brackets 114 may be provided for attaching the cable raceway to external structures, e.g., the underside of a bridge.

It was also described that the cable raceway of the present invention is advantageously compliant with motion caused by factors such as static and/or dynamic loading, seismic activity, meteorological activity, thermal expansion, etc. Such compliance with motion also makes the cable raceway suitable for carrying electrical, communications, or other utility to, e.g., boats docked at a marina, or between, e.g., adjacent railroad carriages.

It was also described that the gaps 230, 240, and 324, and the slots 120 make the cable raceway compliant with variations in the straightness of, e.g., an existing bridge structure. The cable raceway may also be made compliant with extreme variations in the straightness of the existing structure by providing a number of main channel members and/or support channel members with fixed knuckle profiles in both the longitudinal and vertical planes. Main channel covers and support channel covers would also be provided with complementary fixed knuckle profiles.

Therefore, the invention should be limited only by the spirit and scope of the appended claims.

What is claimed is:

1. A cable raceway, comprising:
    a series of first channel members;
    a plurality of second channel members, each second channel member being disposed between a respective pair of successive first channel members, the plurality of second channel members being conterminous with the series of first channel members,
        wherein end portions of each second channel member are disposed in overlaying relationships in the respective pair of successive first channel members; and
    means for movably coupling the end portions of each second channel member to the respective pair of successive first channel members, thereby allowing the end portions of each second channel member to move with multiple degrees-of-freedom.

2. The cable raceway as recited in claim 1,
wherein the end portions of each second channel member move with at least three degrees-of-freedom.

3. The cable raceway as recited in claim 1,
further including a plurality of second channel member covers, each second channel member cover being set over a respective second channel member.

4. The cable raceway as recited in claim 3,
wherein each second channel member cover includes a top portion, a pair of opposing sides extending downward perpendicularly from the top portion, and a pair of steps, each step being formed on an inner surface of a respective side adjacent to the top portion and extending longitudinally along at least a portion of the length of the second channel member cover.

5. The cable raceway as recited in claim 4,
wherein the steps of each second channel member cover rest on respective edges of sides extending upward perpendicularly from a base of the respective second channel member.

6. The cable raceway as recited in claim 3,
further including a plurality of first channel member covers, each first channel member cover being set over a respective first channel member.

7. The cable raceway as recited in claim 6,
wherein each first channel member cover includes a top portion, a pair of opposing sides extending downward perpendicularly from the top portion, and a pair of steps, each step being formed on an inner surface of a respective side adjacent to the top portion and extending longitudinally along at least a portion of the length of the first channel member cover.

8. The cable raceway as recited in claim 7,
wherein the steps of each first channel member cover rest on respective edges of sides extending upward perpendicularly from a base of the respective first channel member.

9. The cable raceway as recited in claim 6,
wherein each first channel member cover overlaps the end portions of the second channel members disposed in the respective first channel member.

10. The cable raceway as recited in claim 9,
wherein each first channel member includes a base and opposing sides extending upward perpendicularly from the base,
wherein each second channel member cover includes a top portion and opposing sides extending downward perpendicularly from the top portion, and
further including a first gap between each side of each first channel member and an adjacent side of the second channel member cover set over the second channel member disposed therein for enabling the end portions of the second channel members to rotate in a plane parallel to the second channel members.

11. The cable raceway as recited in claim 10,
wherein the means for movably coupling includes an elongated slot formed through the end portion of each second channel member and a bolt passing through a spacer attached to the respective overlying first channel member and disposed in the elongated slot, thereby enabling limited movement of the end portions of the second channel members along a line parallel to the longitudinal axes of the first and second channel members.

12. The cable raceway as recited in claim 11,
wherein each second channel member includes a base,
wherein each first channel member cover includes a top portion, and
further including a second gap between an end of each spacer disposed in the elongated slots of the second channel members and the base of each second channel member, and a third gap between each top portion of each first channel member cover and each top portion of the second channel member cover set over the second channel member disposed therein for enabling the end portions of the second channel members to rotate in a plane perpendicular to the second channel members.

13. The cable raceway as recited in claim 6 that can be secured to a support member, further including means for attaching each first channel member to a respective support member.

14. The cable raceway as recited in claim 13, further including a plurality of security covers, each security cover being coupled to a respective first channel member cover, for restricting access to the attaching means.

15. The cable raceway as recited in claim 13, wherein the respective support members are railing posts on a bridge.

16. A method of installing a cable raceway on support members, comprising the steps of:

(a) providing a series of first channel members;

(b) providing a plurality of second channel members;

(c) attaching the first channel members to respective support members;

(d) disposing the end portions of each second channel member in the respective pairs of successive first channel members, thereby making the second channel members conterminous with the first channel members; and (e) coupling the end portions of each second channel member to the respective pairs of successive first channel members, said coupling allowing end portions of each second channel member to move with multiple degrees of freedom.

17. The method as recited in claim 16, further comprising the step of (f) laying cable in the conterminous first and second channel members.

18. The method as recited in claim 17, further comprising the further steps of:

(g) providing first and second channel covers;

(h) setting the second channel member covers over respective second channel members; and (i) setting the first channel member covers over respective first channel members.

19. A cable raceway, comprising:

a series of first channel members;

a plurality of second channel members, each second channel member being disposed between a respective pair of successive first channel members, the plurality of second channel members being conterminous with the series of first channel members, a plurality of first channel member covers, each first channel member cover being set over a respective first channel member, a plurality of second channel member covers, each second channel member cover being set over a respective second channel member, wherein each first and second channel member cover includes a top portion, a pair of opposing sides extending downward perpendicularly from the top portion, and a pair of steps, each step being formed on an inner surface of a respective side adjacent to the top portion and extending longitudinally along at least a portion of the length of the channel member cover, and wherein the steps of each channel member cover rest on respective edges of sides extending upward perpendicularly from a base of a respective channel member.

20. The cable raceway as recited in claim 19, wherein each first channel member cover overlaps the end portions of the second channel members disposed in the respective first channel member, and wherein an inner surface of the top portion of each first channel member cover includes a stop bar transverse to the first channel member cover for preventing excessive shifting of the second channel member covers.

* * * * *